United States Patent
Furusawa et al.

(10) Patent No.: US 8,247,035 B2
(45) Date of Patent: Aug. 21, 2012

(54) METHOD FOR FORMING MULTILAYER COATING FILM

(75) Inventors: Satoru Furusawa, Hiratsuka (JP); Takato Adachi, Hiratsuka (JP); Shingo Sato, Hiratsuka (JP); Terutaka Takahashi, Hiratsuka (JP)

(73) Assignee: Kansai Paint Co., Ltd., Hyogo-Ken (JP)

( * ) Notice: Subject to any disclaimer, the term of this patent is extended or adjusted under 35 U.S.C. 154(b) by 928 days.

(21) Appl. No.: 12/226,564

(22) PCT Filed: Apr. 24, 2007

(86) PCT No.: PCT/JP2007/059346
§ 371 (c)(1),
(2), (4) Date: Oct. 22, 2008

(87) PCT Pub. No.: WO2007/126107
PCT Pub. Date: Nov. 8, 2007

(65) Prior Publication Data
US 2009/0117396 A1   May 7, 2009

(30) Foreign Application Priority Data

Apr. 25, 2006 (JP) ................................. 2006-121115
Jun. 28, 2006 (JP) ................................. 2006-178833
Nov. 14, 2006 (JP) ................................ 2006-308307

(51) Int. Cl.
*B05D 1/36* (2006.01)
*B05D 3/02* (2006.01)
*B05D 7/16* (2006.01)
*B05D 7/26* (2006.01)

(52) U.S. Cl. ............... 427/379; 427/384; 427/385.5; 427/388.4; 427/402; 427/407.1; 427/409

(58) Field of Classification Search .............. 427/379, 427/384, 385.5, 388.4, 402, 407.1, 409
See application file for complete search history.

(56) References Cited

U.S. PATENT DOCUMENTS

| | | | | |
|---|---|---|---|---|
| 4,935,488 A | * | 6/1990 | Omatsu et al. | 528/272 |
| 5,993,911 A | * | 11/1999 | Brenke et al. | 427/407.1 |
| 2001/0022994 A1 | * | 9/2001 | Sugiura et al. | 427/385.5 |
| 2003/0113561 A1 | * | 6/2003 | Katsuta et al. | 428/480 |

FOREIGN PATENT DOCUMENTS

| | | |
|---|---|---|
| JP | 2001-327911 | 11/2001 |
| JP | 2002-282773 | 10/2002 |
| JP | 2004-025046 | 1/2004 |
| JP | 2004-298837 | 10/2004 |
| JP | 2006-022216 | 1/2006 |

* cited by examiner

*Primary Examiner* — Leo B Tentoni
(74) *Attorney, Agent, or Firm* — Wenderoth, Lind & Ponack, L.L.P.

(57) ABSTRACT

This invention offers a method for forming multilayer coating film by successively applying onto a coating object a water-based first coloring paint, water-based second coloring paint and clear paint, and simultaneously baking the resultant first coloring coating film, second coloring coating film and clear coating film, in which the water-based first coloring paint (A) comprises polyester resin and curing agent, the polyester resin containing benzene ring and cyclohexane ring in its molecules, their combined content in the polyester resin being within a range of 1.0-2.2 mols/kg (solid resin content); and that the curing agent is at least one compound selected from the group consisting of isocyanate group-containing compound, oxazoline group-containing compound, carbodiimide group-containing compound, hydrazide group-containing compound and semicarbazide group-containing compound. According to this method, multilayer coating film excelling in smoothness, distinctness of image, chipping resistance and water resistance can be formed by 3-coat-1-bake system.

14 Claims, No Drawings

METHOD FOR FORMING MULTILAYER COATING FILM

TECHNICAL FIELD

This invention relates to a method for forming multilayer coating film having excellent appearance, by 3-coat-1-bake system comprising successively applying onto a coating object, water-based first coloring paint, water-based second coloring paint and clear paint, and heat-curing the resulting 3-layered multilayer coating film simultaneously.

BACKGROUND ART

As coating film-forming methods on car bodies, generally those for forming multilayer coating film by 3-coat-2-bake (3C2B) system comprising, after applying an electrocoating paint on the coating object, application of intermediate paint→curing by baking→application of water-based base coat paint→preheating (preliminary heating)→application of clear paint→curing by baking, have been widely adopted. Whereas, for energy-saving, attempts are made in recent years to omit the bake-curing step after application of intermediate paint and adopt 3-coat-1-bake (3C1B) system comprising, after applying an electrocoating paint on the coating object, application of water-based intermediate paint→preheating (preliminary heating)→application of water-based base coat paint→preheating (preliminary heating)→application of clear paint→curing by baking (e.g., see JP 2002-282773A).

However, in the above 3C1B system layer-mixing is apt to take place between the intermediate coating film and base coating film, and hence such problems arise as reduction in smoothness or distinctness of image of resulting coating film, reduction in chipping resistance or water resistance caused presumably by change in curing balance accompanying migration of curing agent at the interface of the coating films.

DISCLOSURE OF THE INVENTION

The object of the present invention resides in provision of a method for forming multilayer coating film excelling in smoothness, distinctness of image, chipping resistance and water resistance, by 3C1B system.

We have engaged in ardent investigations with the view to accomplish the above object, to now find that multilayer coating film excelling in smoothness, distinctness of image, chipping resistance and water resistance could be formed by using a paint comprising polyester resin (X) containing benzene ring and cyclohexane ring in its molecules at a specific content, and at least one curing agent (Y) selected from the group consisting of isocyanate group-containing compound (a), oxazoline group-containing compound (b), carbodiimide group-containing compound (c), hydrazide group-containing compound (d) and semicarbazide group-containing compound (e), as the water-based first coloring paint in 3C1B system multilayer coating film forming steps, and come to complete the present invention.

Thus, the present invention relates to a method for forming multilayer coating film by successively conducting the following steps (1)-(4):

(1) a step of applying onto a coating object a water-based first coloring paint (A) to form the first coloring coating film, (2) a step of applying a water-based second coloring paint (B) on the first coloring coating film as formed in the step (1), to form the second coloring coating film, (3) a step of applying a clear paint (C) on the second coloring coating film as formed in the step (2), to form the clear coating film, and (4) a step of simultaneously baking the first coloring coating film, second coloring coating film and clear coating film as formed in the steps (1)-(3), the method being characterized in that the water-based first coloring paint (A) comprises polyester resin (X) and curing agent (Y), the polyester resin (X) containing benzene ring and cyclohexane ring in its molecules, their combined content in the polyester resin being within a range of 1.0-2.2 mols/kg (solid resin content); and that the curing agent (Y) is at least one compound selected from the group consisting of isocyanate group-containing compound (a), oxazoline group-containing compound (b), carbodiimide group-containing compound (c), hydrazide group-containing compound (d) and semicarbazide group-containing compound (e).

According to the multilayer coating film-forming method of the present invention, multilayer coating film excelling in smoothness, distinctness of image, chipping resistance and water resistance can be formed on coating objects by 3-coat-1-bake system.

Hereinafter the multilayer coating film-forming method of the invention is explained in further details, by the order of each of the above steps.

Step (1):

According to the multilayer coating film-forming method of the present invention, first a water-based first coloring paint (A) comprising a polyester resin (X) containing benzene ring and cyclohexane ring in its molecules, the combined content of the rings being within a range of 1.0-2.2 mols/kg (solid resin content), and a curing agent (Y) which is at least one compound selected from the group consisting of isocyanate group-containing compound (a), oxazoline group-containing compound (b), carbodiimide group-containing compound (c), hydrazide group-containing compound (d) and semicarbazide group-containing compound (e), is applied onto a coating object.

Polyester Resin (X)

Polyester resin (X) which is used as the base resin in the water-based first coloring agent (A) contains benzene ring and cyclohexane ring in its molecules, the combined content of the rings being within a range of 1.0-2.2 mols/kg (solid resin content), preferably 1.2-2.0 mols/kg (solid resin content), inter alia, 1.4-1.9 mols/kg (solid resin content).

It is convenient to use the polyester resin (X) at a ratio of generally 10-95 mass parts, in particular, 20-70 mass parts, inter alia, 20-70 mass parts, per 100 mass parts of solid resin content of the water-based first coloring paint (A).

Here the solid resin content of a paint is the combined mass of the polyester resin (X), curing agent (Y), other base resin(s) additionally used where necessary and optionally added modifying resin(s).

In the present invention, "combined content of benzene ring and cyclohexane ring" means the combined mol number of the benzene ring and cyclohexane ring that are contained per 1 kg (solid content) of the polyester resin, which can be calculated by dividing the combined mol number (Wm) of the benzene ring and cyclohexane ring contained in the monomers used for synthesis of the polyester resin by the mass (Wr: unit, kg) of the formed resin excluding the water of condensation (i.e., Wm/Wr).

The polyester resin (X) can be prepared, for example, by subjecting polybasic acid component and polyhydric alcohol component, at least one of the components containing benzene ring and/or cyclohexane ring, and further, where necessary, monobasic acid such as benzoic acid and/or monohydric alcohol, to esterification reaction or ester-interchange reaction.

The polybasic acid component covers those compounds having at least two carboxyl groups per molecule, examples of which include polybasic acids such as phthalic acid, isophthalic acid, terephthalic acid, succinic acid, adipic acid, azelaic acid, sebacic acid, tetrahydrophthalic acid, hexahydrophthalic acid, maleic acid, fumaric acid, itaconic acid, trimellitic acid, pyromellitic acid and the like; anhydrides of these polybasic acids; and lower alkyl esters of these polybasic acids. They can be used either alone or in combination of two or more.

Of these, as the polybasic acid component having benzene ring, for example, such polybasic acids as phthalic acid, isophthalic acid, terephthalic acid, trimellitic acid and pyromellitic acid; anhydrides of these polybasic acids; and lower alkyl esters of these polybasic acids can be named. As examples of the polybasic acid component having cyclohexane ring, such polybasic acids such as cyclohexane-1,3-dicarboxylic acid, cyclohexane-1,4-dicarboxylic acid, hexahydrophthalic acid, hexahydroisophthalic acid, hexahydroterephthalic acid, hexahydrotrimellitic acid and methylhexahydrophthalic acid; anhydrides of these polybasic acids; and lower alkyl esters of these polybasic acids can be named.

Polyhydric alcohol component covers the compounds having at least two hydroxyl groups per molecule, examples of which include α-glycols such as ethylene glycol, 1,2-propylene glycol, 1,2-butylene glycol, 2,3-butylene glycol, 1,2-hexanediol, 1,2-dihydroxycyclohexane, 3-ethoxypropane-1,2-diol, 3-phenoxypropane-1,2-diol and the like; neopentyl glycol, 2-methyl-1,3-propanediol, 2-methyl-2,4-pentanediol, 3-methyl-1,3-butanediol, 2-ethyl-1,3-hexanediol, 2,2-diethyl-1,3-propanediol, 2,2,4-trimethyl-1,3-pentanediol, 2-butyl-2-ethyl-1,3-propanediol, 2-phenoxypropane-1,3-diol, 2-methyl-2-phenylpropane-1,3-diol, 1,3-propylene glycol, 1,3-butylene glycol, 2-ethyl-1,3-octanediol, 1,3-dihydroxycyclohexane, 1,4-butanediol, 1,4-dihydroxycyclohexane, 1,5-pentanediol, 1,6-hexanediol, 2,5-hexanediol, 3-methyl-1,5-pentanediol, 1,4-dimethylolcyclohexane, tricyclodecanedimethanol, 2,2-dimethyl-3-hydroxypropyl-2,2-dimethyl-3-hydroxypropionate (which is an ester of hydroxypivalic acid with neopentyl glycol), bisphenol A, bisphenol F, bis(4-hydroxyhexyl)-2,2-propane, bis(4-hydroxyhexyl)methane, 3,9-bis(1,1-dimethyl-2-hydroxyethyl)-2,4,8,10-tetroxaspiro[5,5]-undecane, diethylene glycol, triethylene glycol, glycerin, diglycerin, triglycerin, pentaerythritol, dipentaerythritol, sorbitol, mannitol, trimethylolethane, trimethylolpropane, ditrimethylolpropane, tris(2-hydroxyethyl)isocyanurate and the like. These can be used either alone or in combination of two or more.

Of these, polyhydric alcohol component having benzene ring include, for example, bisphenol A and bisphenol F, and examples of polyhydric alcohol component having cyclohexane ring include 1,3-dihydroxycyclohexane, 1,3-cyclohexanedimethanol, 1,4-dihydroxycyclohexane, 1,4-cyclohexanedimethanol, hydrogenated bisphenol A and hydrogenated bisphenol F.

The esterification or ester-interchange reaction of the polybasic acid component with polyhydric alcohol component can be carried out by the methods known per se, for example, by polycondensing the polybasic acid component with polyhydric alcohol component at about 180-about 250° C., The polyester resin (X) can also be obtained by first preparing a hydroxyl- and/or carboxyl-containing polyester resin from above polybasic acid component and polyhydric alcohol component, and reacting the hydroxyl and/or carboxyl groups in the polyester resin with a compound having functional group reactable with hydroxyl and/or carboxyl groups and benzene ring and/or cyclohexane ring. As examples of such a compound, monobasic acid having benzene ring and/or cyclohexane ring, such as benzoic acid; and acrylic resin having benzene ring and/or cyclohexane ring and isocyanate groups can be named.

Introduction of hydroxyl groups and/or carboxyl groups into skeletal structure of polyester resin can be done, for example, by concurrent use with dibasic acid and dihydric alcohol in the esterification reaction, of polyhydric alcohol component having at least three hydroxyl groups per molecule and/or polybasic acid component having at least three carboxyl groups per molecule. It is also possible to first prepare a hydroxy-containing polyester resin from the polybasic acid component and polyhydric alcohol component, and to introduce carboxyl groups thereinto, by reacting hydroxyl groups in the polyester resin with polybasic acid such as maleic acid, maleic anhydride, phthalic anhydride, trimellitic anhydride and the like.

The polyester resin may be modified, either during its preparation or after the esterification reaction, with fatty acid, monoepoxy compound (e.g., CARDURA E10, tradename, HEXION Specialty Chemicals Co., a glycidyl ester of synthetic highly branched fatty acid) or the like. As examples of the fatty acid, coconut oil fatty acid, cottonseed oil fatty acid, hempseed oil fatty acid, rice bran oil fatty acid, fish oil fatty acid, tall oil fatty acid, soybean oil fatty acid, linseed oil fatty acid, tung oil fatty acid, rape seed oil fatty acid, castor oil fatty acid, dehydrated castor oil fatty acid, sufflower oil fatty acid and the like can be named.

The polyester resin (X) preferably has an acid value within a range of generally 5-80 mgKOH/g, in particular, 10-70 mgKOH/g, inter alia, 15-50 mgKOH/g, from the viewpoint of storage stability of the paint and water resistance of resulting coating film; and a hydroxyl value within a range of generally 60-200 mgKOH/g, in particular, 80-185 mgKOH/g, inter alia, 100-170 mgKOH/g, from the viewpoint of water resistance of resulting coating film.

The polyester resin (X) furthermore preferably has a number-average molecular weight within a range of generally 500-4,000, in particular, 600-3,000, inter alia, 700-2,000 from the viewpoint of smoothness, distinctness of image and chipping resistance of resulting coating film; and a glass transition temperature within a range of generally −60-20° C., in particular, −50-10° C., inter alia, −30-5° C., from the viewpoint of chipping resistance.

Those number-average molecular weight and weight-average molecular weight in the present specification are the number-average molecular weight or weight-average molecular weight as measured with gel permeation chromatograph (tradename: HLC8120GPC, Tosoh Corporation) and converted based on the molecular weight of standard polystyrene. In the measurement, four columns of TSKgel G-4000 HXL, TSKgel G-3000 HXL, TSKgel G-2500 HXL and TSKgel G-2000 HXL (tradenames, Tosoh Corporation) and the following conditions were used: mobile phase, tetrahydrofuran; measuring temperature, 40° C.; flow rate, 1 mL/min. and the detector, RI.

In order to facilitate dissolution or dispersion of the polyester resin (X) in water, carboxyl groups present in its molecules are preferably neutralized. As the neutralizer useful in the occasion, for example, ammonia; and amines such as methylamine, ethylamine, propylamine, isopropylamine, butylamine, 2-ethylhexylamine, cyclohexylamine, dimethylamine, diethylamine, dipropylamine, diisopropylamine, dibutylamine, trimethylamine, triethylamine, triisopropylamine, tributylamine, ethylenediamine, morpholine, N-alkylmorpholine, pyridine, monoisopropanolamine, methylethanolamine, methylisopropanolamine, dimethylethanol-amine, diisopropanolamine, diethanolamine, triethanolamine, diethylethanolamine, triethanolamine and the like can be named. The adequate use rate of the neutralizer is normally within a range of 0.1-2.0 equivalent, preferably 0.3-1.2 equivalent, to the carboxyl groups in the polyester resin (X).

Curing Agent (Y)

In the water-based first coloring paint (A) according to the present invention, at least one compound selected from the group consisting of isocyanate group-containing compound (a), oxazoline group-containing compound (b), carbodiimide group-containing compound (c), hydrazide group-containing compound (d) and semicarbazide group-containing compound (e) is used as the curing agent (Y). From the viewpoint of distinctness of image of resulting coating film, isocyanate group-containing compound (a) among these is preferred as the curing agent (Y).

The curing agent (Y) is preferably used at a ratio of generally 1-60 mass parts, in particular, 10-50 mass parts, inter alia, 20-40 mass parts, per 100 mass parts of the solid resin content of the water-based first coloring paint (A).

Where the polyester resin (X) contains hydroxyl groups, use of isocyanate group-containing compound (a) as the curing agent (Y) is desirable, and as the polyester resin (X), normally those having a hydroxyl value within a range of 60-200 mgKOH/g, preferably 80-190 mgKOH/g, inter alia, 110-170 mgKOH/g are suitable. In that occasion, it is recommendable to use as isocyanate group-containing compound (a) at a ratio to render the equivalent ratio (NCO/OH) of the isocyanate group to the hydroxyl group in the polyester resin (X), within a range of normally 0.5-2.0, in particular, 0.8-1.5.

The isocyanate group-containing compound (a) refers to those compounds which contain at least two isocyanate groups per molecule, for example, aliphatic polyisocyanate, alicyclic polyisocyanate, aromatic-aliphatic polyisocyanate, aromatic polyisocyanate and derivatives of these polyisocyanates.

Examples of the aliphatic polyisocyanate include aliphatic diisocyanates such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, 2,6-diisocyanatomethyl caproate and the like; and aliphatic triisocyanates such as lysine ester triisocyanate, 1,4,8-triisocyanatooctane, 1,6,11-triisocyanatoundecane, 1,8-diisocyanato-4-isocyanatomethyloctane, 1,3,6-triisocyanatohexane, 2,5,7-trimethyl-1,8-diisocyanato-5-isocyanatomethyloctane and the like.

Examples of the alicyclic polyisocyanate include alicyclic diisocyanates such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), methyl-2,4-cyclohexane diisocyanate, methyl-2,6-cyclohexane diisocyanate, 1,3- or 1,4-bis(isocyanato-methyl)cyclohexane (common name: hydrogenated xylylene diisocyanate) or mixtures thereof, norbornane diisocyanate and the like; and alicyclic triisocyanates such as 1,3,5-triisocyanatocyclo-hexane, 1,3,5-trimethylisocyanatocyclohexane, 2-(3-isocyanatopropyl)-2,5-di(isocyanatomethyl)-bicyclo(2.2.1)heptane, 2-(3-isocyanatopropyl)-2,6-di(isocyanatomethyl)-bicyclo(2.2.1)heptane, 2-(3-isocyanatopropyl)-2,6-di(isocyanatomethyl)-bicyclo(2.2.1)heptane, 3-(3-isocyanatopropyl)-2,5-di(isocyanatomethyl)-bicyclo(2.2.1)heptane, 5-(2-isocyanatoethyl)-2-isocyanatomethyl-3-(3-isocyanatopropyl)-bicyclo(2.2.1)heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)heptane, 6-(2-isocyanatoethyl)-2-isocyanatomethyl-2-(3-isocyanatopropyl)-bicyclo(2.2.1)heptane and the like.

Examples of the aromatic-aliphatic polyisocyanate include aromatic-aliphatic diisocyanates such as 1,3- or 1,4-xylylene diisocyanate or mixtures thereof, ω, ω'-diisocyanato-1,4-diethylbenzene, 1,3- or 1,4-bis(1-isocyanato-1-methylethyl)benzene (common name: tetramethylxylylene diisocyanate) or mixtures thereof, and aromatic-aliphatic triisocyanates such as 1,3,5-triisocyanatomethylbenzene and the like.

Examples of the aromatic polyisocyanate include aromatic diisocyanates such as m-phenylene diisocyanate, p-phenylene diisocyanate, 4,4'-diphenyl diisocyanate, 1,5-naphthalene diisocyanate, 2,4'- or 4,4'-diphenylmethane diisocyanate or mixtures thereof, 2,4- or 2,6-tolylene diisocyanate or mixtures thereof, 4,4'-toluidine diisocyanate, 4,4'-diphenylether diisocyanate and the like; aromatic triisocyanates such as triphenylmethane-4,4',4"-triisocyanate, 1,3,5-triisocyanatobenzene, 2,4,6-triisocyanatotoluene and the like; and aromatic tetraisocyanates such as 4,4'-diphenylmethane-2,2', 5,5'-tetraisocyanate and the like.

Also as the polyisocyanate derivatives, for example, dimers, trimers, biurets, allophanates, urethodiones, urethoimines, isocyanurates, oxadiazintrione, polymethylene polyphenyl polyisocyanate (crude MDI, polymeric MDI), crude TDI of above polyisocyanate compounds can be named.

Above polyisocyanates and derivatives thereof can be used either alone or in combination of two or more. It is preferable to use, either singly or in combination of two or more, aliphatic diisocyanates, alicyclic diisocyanates and their derivatives, among these polyisocyanates.

As the isocyanate group-containing compound (a), hydrophilic polyisocyanate compound (a') formed by modifying above polyisocyanate compounds to impart thereto hydrophilicity, from the viewpoint of smoothness of resulting coating film.

As hydrophilic polyisocyanate compound (a'), for example, anionic hydrophilic polyisocyanate compound (a'-1) obtained through reaction of active hydrogen group in active hydrogen group-containing compound having anionic group with isocyanate group in the polyisocyanate compound; and nonionic hydrophilic polyisocyanate compound (a'-2) obtained through reaction of hydrophilic polyether alcohol such as monoalcohol of polyoxyethylene with polyisocyanate compound can be named. Of those, anionic hydrophilic polyisocyanate compound (a'-1) is particularly preferred because of excellent smoothness of resulting coating film.

Above active hydrogen group-containing compound having anionic group covers those compounds having anionic groups such as carboxyl, sulfonic acid or phosphoric acid groups, and betaine structure-containing group; and also active hydrogen group reactable with isocyanate group, such as hydroxyl, amino and the like groups. Through reaction of the compound with polyisocyanate compound, hydrophilicity can be imparted to the polyisocyanate compound.

The active hydrogen group-containing compound having anionic group is not particularly limited and, for example, those compounds having one anionic group and at least two active hydrogen groups can be used. More specifically, examples of active hydrogen group-containing compound having carboxyl group include dihydroxycarboxylic acids such as 2,2-dimethylolacetic acid, 2,2-dimethylollactic acid, 2,2-dimethylolpropionic acid, 2,2-dimethylolbutanoic acid, dimethylolheptanoic acid, dimethylolnonanoic acid, 2,2-dimethylolbutyric acid, 2,2-dimethylolvaleric acid and the like; diaminocarboxylic acids such as 1-carboxy-1,5-pentylenediamine, dihydroxybenzoic acid, 3,5-diaminobenzoic acid, lysine, alginine and the like; and half-ester compounds of polyoxypropylenetriol with maleic anhydride or ophthalic anhydride.

Examples of active hydrogen group-containing compound having sulfonic acid group include N,N-bis(2-hydroxyethyl)-2-aminoethanesulfonic acid, 1,3-phenylenediamine-4,6-disulfonic acid, diaminobutanesulfonic acid, 3,6-diamino-2-toluenesulfonic acid, 2,4-diamino-5-toluenesulfonic acid, 2-(cyclohexylamino)-ethanesulfonic acid, 3-(cyclohexylamino)-propanesulfonic acid and the like.

Examples of active hydrogen group-containing compound having phosphoric acid group include 2,3-dihydroxypropylphenyl phosphate and the like.

Examples of active hydrogen group-containing compound having betaine structure-containing group include sulfobetaine group-containing compounds obtained through reaction of tertiary amine such as N-methyldiethanolamine with 1,3-propanesultone.

These active hydrogen group-containing compounds having anionic group can be converted to alkylene oxide modifications, by addition of alkylene oxide such as ethylene oxide or propylene oxide.

These active hydrogen group-containing compounds having anionic group can be used either alone or in combination of two or more.

As the anionic hydrophilic polyisocyanate compound (a'-1), use of anionic hydrophilic polyisocyanate compound obtained by reaction of active hydrogen groups in active hydrogen group-containing compound having sulfonic acid group and/or phosphoric acid group with isocyanate groups of polyisocyanate compound is particularly preferred, from the viewpoint of smoothness of resulting coating film.

As polyisocyanate compounds which can be converted to hydrophilic modified polyisocyanate compounds (a'), those polyisocyanate compounds listed in the above can be used, preferred examples including hexamethylene diisocyanate (HMDI), derivatives of hexamethylene diisocyanate (HMDI), isophorone diisocyanate (IPDI) and derivatives of isophorone diisocyanate (IPDI).

Where the polyester resin (X) has carboxyl groups, oxazoline group-containing compound (b) can be used as the curing agent (Y). As oxazoline group-containing compound (b), polymeric compound (b-1) having at least two oxazoline groups at its side chain, monomeric compound (b-2) having at least two oxazoline groups per molecule and the like can be named as preferred examples. Here oxazoline group is represented by the following formula:

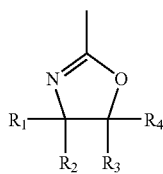

[in the formula, $R_1$, $R_2$, $R_3$ and $R_4$ each independently stands for hydrogen atom or $C_{1-20}$ alkyl group].

The polymeric compound (b-1) having at least two oxazoline groups at its side chain can be obtained by polymerizing oxazoline group-containing polymerizable unsaturated monomer (b-1a), where necessary, with other polymerizable unsaturated monomer (b-1b) in the presence of radical-polymerization initiator.

The monomer (b-1a) is a compound containing at least one each of oxazoline group and polymerizable unsaturated bond per molecule, examples of which include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-ethyl-2-oxazoline and the like.

The monomer (b-1b) is a compound containing at least one polymerizable unsaturated bond per molecule, other than the above monomer (b-1a), examples of which include $C_{1-24}$ alkyl or cycloalkyl esters of (meth)acrylic acid such as methyl (meth)acrylate, ethyl (meth)acrylate, propyl (meth)acrylate, butyl (meth)acrylate, 2-ethylhexyl (meth)acrylate, cyclohexyl (meth)acrylate, lauryl (meth)acrylate, isobornyl (meth)acrylate and the like; $C_{2-8}$ hydroxyalkyl esters of (meth)acrylic acid such as 2-hydroxyethyl (meth)acrylate, hydroxypropyl (meth)acrylate and the like; vinyl aromatic compounds such as styrene, vinyltoluene and the like; (meth)acrylamide, dimethylaminopropyl (meth)acrylamide, dimethylaminoethyl (meth)acrylate, adducts of glycidyl (meth)acrylate to amines; polyethylene glycol (meth)acrylate; N-vinylpyrrolidone, ethylene, butadiene, chloroprene, vinyl propionate, vinyl acetate, (meth)acrylonitrile and the like, which can be used either alone or in combination of two or more. In the present invention, "(meth)acrylate" at the end of each compound name means acrylate or methacrylate.

As the radical-polymerization initiator useful for the (co)polymerization of above unsaturated monomers, those known per se can be used, examples of which include peroxides such as benzoyl peroxide, di-t-butyl hydroperoxide, t-butyl hydroperoxide, cumyl peroxide, cumene hydroperoxide, diisopropylbenzene hydroperoxide, t-butyl peroxybenzoate, lauryl peroxide, acetyl peroxide, t-butyl peroxy-2-ethylhexanoate and the like; and azo compounds such as α, α'-azobisisobutyronitrile, α, α'-azobis-2-methylbutyronitrile, azobisdimethylvaleronitrile, azobiscyclohexanecarbonitrile and the like.

The monomer (b-1a) content of the polymeric compound (b-1) can be, based on the combined mass with the monomer (b-1b), within a range of normally 1-100 mass %, preferably 10-60 mass %, inter alia, 20-50 mass %. It is adequate for the polymeric compound (b-1) to have a number-average molecular weight within a range of normally 500-100,000, in particular, 1,000-50,000, inter alia, 3,000-30,000. Polymerization of the monomer (b-1a) and monomer (b-1b) can be performed by the methods known per se, such as solution polymerization, emulsion polymerization or the like, and the resulting polymeric compound (b-1) can be either water-soluble or water-dispersible.

On the other hand, as the monomeric compound (b-2), for example, 2,2'-bis-(2-oxazoline), 2,2'-methylene-bis-(2-oxazoline), 2,2'-ethylene-bis-(2-oxazoline), 2,2'-trimethylene-bis-(2-oxazoline), 2,2'-tetramethylene-bis-(2-oxazoline), 2,2'-hexamethylene-bis-(2-oxazoline), 2,2'-octamethylene-bis-(2-oxazoline), 2,2'-ethylene-bis-(4,4'-dimethyl-2-oxazoline), 2,2'-p-phenylene-bis-(2-oxazoline), 2,2'-m-phenylene-bis-(2-oxazoline), 2,2'-m-phenylene-bis-(4,4'-dimethyl-2-oxazoline, bis-(2-oxazolynylcyclohexane) sulfide, bis-(2-oxazolynylnorbornane) sulfide and the like can be named, which can be used either alone or in combination of two or more.

It is also permissible to concurrently use the polymeric compound (b-1) having at least two oxazoline groups in its side chain and the monomeric compound (b-2) having at least two oxazoline groups per molecule.

Suitable use rate of the oxazoline group-containing compound (b) as the curing agent (Y) is such that, per mol of carboxyl groups in the polyester resin (X), the oxazoline groups in the oxazoline group-containing compound (b) is within a range of normally 0.2-1.0 mol, in particular, 0.5-1.0 mol, in respect of low-temperature curability.

Where the polyester resin (X) contains carboxyl groups, carbodiimido group-containing resin (c) may also be used as curing agent (Y). Carbodiimido group-containing resin (c) can be obtained, for example, by de-carbon dioxide reaction between isocyanate groups of a polyisocyanate compound. As commercially available products, for example, CARBODILITE V-02, CARBODILITE V-02-L2, CARBODILITE V-04, CARBODILITE E-01 and CARBODILITE E-02 (all tradenames, Nisshinbo Industries, Inc.) can be used.

When such oxazoline group-containing compound (b) or carbodiimido group-containing compound (c) is used as the curing agent (Y), polyester resin (X) containing carboxyl groups can be used. In particular, such polyester resin (X) whose acid value attributable to carboxyl groups therein is within a range of normally 5-80 mgKOH/g, in particular, 10-70 mgKOH/g, inter alia, 30-70 mgKOH/g is suitable.

Hydrazide group-containing compound (d) covers the compounds having at least 2, preferably 2-10, hydrazide groups as expressed by a formula, —CO—NH—NH$_2$, per molecule, examples of which include dihydrazides of $C_{2-18}$ saturated dicarboxylic acids such as oxalic dihydrazide, malonic dihydrazide, glutaric dihydrazide, succinic dihydrazide, adipic dihydrazide, sebacic dihydrazide and the like; dihydrazides of monoolefinic unsaturated dicarboxylic acids such as maleic dihydrazide, fumaric dihydrazide, itaconic dihydrazide and the like; phthalic dihyrazide, terephthalic dihydrazide or isophthalic dihydrazide; dihyrazide, trihydrazide or tetrahydrazide of pyromellitic acid; nitirilotrihydrazide, citric trihydrazide, 1,2,4-benzene trihydrazide, ethylenediamine tetraacetic tetrahydrazide, 1,4,5,8-naphthoic tetrahydrazide; polyhydrazides obtained by reaction of low molecular weight polymers having carboxylic acid lower alkyl ester groups with hydrazine or hydrazine hydrate; and carbonic dihydrazide and the like.

Semicarbazide group-containing compound (e) covers the compounds having at least 2, preferably 2-10, semicarbazide groups represented by the formula —NH—CO—NH—NH$_2$, per molecule, examples of which include bissemicarbazide; polyfunctional semicarbazides obtained by reaction of diisocyanate such as hexamethylene diisocyanate or isophorone diisocyanate or polyisocyanate compound derived therefrom with excessive N,N-substituted hydrazine such as N,N-dimethylhydrazine or above-exemplified hydrazides, aqueous polyfunctional semicarbazides obtained by reacting isocyanate groups in the reaction products of the polyisocyanate compounds with polyether and active hydrogen compound containing hydrophilic group such as polyols or polyethylene glycol monoalkyl ethers, with an excess of above-exemplified dihydrazide; semicarbazide group-containing compounds such as mixtures of the polyfunctional semicarbazides and aqueous polyfunctional semicarbazides; and hydrazone group-containing compounds such as bisacetyldihydrazone.

These hydrazide group-containing compound (d) or semicarbazide group-containing compounds (e) can be generally used in combination with the polyester resin (X) having carbonyl groups.

Water-Based First Coloring Paint (A)

The water-based first coloring paint (A) used in the step (1) according to the present invention can contain, besides the polyester resin (X), modifying resin such as water-soluble or water-dispersible polyurethane resin, acrylic resin, alkyd resin, polyester resin, silicone resin, fluorinated resin, epoxy resin or the like. In particular, for favorable finished appearance and chipping resistance, it preferably contains the polyurethane resin and/or acrylic resin.

The water-based first coloring paint (A) can contain, in addition to the curing agent (Y), melamine resin, blocked polyisocyanate compound and urethane-modified polyester resin concurrently having hydroxyl group and blocked isocyanate group per molecule, and the like as auxiliary crosslinking agent.

As the melamine resin, for example, partially or wholly methylolated melamine resins obtained through reaction of melamine with aldehyde can be named, examples of the aldehyde being formaldehyde and paraformaldehyde. Also such methylolated melamine resins whose methylol groups are partially or wholly etherified with alcohol can be used, examples of the alcohol used for the etherification including methyl alcohol, ethyl alcohol, n-propyl alcohol, i-propyl alcohol, n-butyl alcohol, i-butyl alcohol, 2-ethyl butanol and 2-ethylhexanol.

As specific examples of the melamine resin, Nihon Cytec Industries Inc.'s Cymel 303, Cymel 323, Cymel 325, Cymel 327, Cymel 350, Cymel 370, Cymel 380, Cymel 385, Cymel 212, Cymel 251, Cymel 254 and Mycoat 776 (all tradenames); Monsanto Chemical Co's Regimin 735, Regimin 740, Regimin 741, Regimin 745, Regimin 746 and Regimin 747 (all tradenames); Sumitomo Chemicals Co.'s Sumimal M55, Sumimal M30W and Sumimal M50W (all tradenames); and Mitsui Chemicals, Inc.'s U-VAN series such as U-VAN20SB (tradename) and the like can be named.

When the melamine resin is used as auxiliary crosslinking agent, sulfonic acid such as paratoluenesulfonic acid, dodecylbenzenesulfonic acid, dinonylnaphthalenesulfonic acid and the like, or salts of these acids with amines can be used as catalyst.

The blocked polyisocyanate compound covers those polyisocyanate compounds as exemplified in the explanation of the isocyanate group-containing compound (a), whose isocyanate groups are blocked with a blocking agent. The reaction of the polyisocyanate compound with the blocking agent can be conducted by the means known per se.

Blocking agent is a compound for temporarily blocking free isocyanate groups, which dissociates when the blocked polyisocyanate compound is heated to, for example, 100° C. or higher, preferably 130° C. or higher, to regenerate free isocyanate groups which are readily reactable with hydroxyl groups or the like. Examples of blocking agent include phenols such as phenol, cresol, xylenol, nitrophenol, ethylphenol, hydroxydiphenyl, butylphenol, isopropylphenol, nonylphenol, octylphenol, methyl hydroxybenzoate and the like; lactams such as ε-caprolactam, δ-valerolactam, γ-butyrolactam, β-propiolactam and the like; aliphatic alcohols such as methanol, ethanol, propyl alcohol, butyl alcohol, amyl alcohol, lauryl alcohol and the like; ethers such as ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxymethanol and the like; benzyl alcohol; glycolic acid; glycolic acid esters such as methyl glycolate, ethyl glycolate, butyl glycolate and the like; lactic acid; lactic acid esters such as methyl lactate, ethyl lactate, butyl lactate and the like; alcohols such as methylolurea, methylolmelamine, diacetone alcohol, 2-hydroxyethyl acrylate, 2-hydroxyethyl methacrylate and the like; oximes such as formaldoxime, acetamidoxime, acetoxime, methyl ethyl ketoxime, diacetylmonooxime, benzophenone-oxime, cyclohexane-oxime and the like; active methylenes such as dimethyl malonate, diethyl malonate, ethyl acetoacetate, methyl acetoacetate, acetylacetone and the like; mercaptans such as butyl mercaptan, t-butyl mercaptan, hexyl mercaptan, t-dodecyl mercaptan, 2-mercaptobenzothiazole, thiophenol, methylthiophenol, ethylthiophenol and the like; acid amides such as acetanilide, acetanisidide, acetotoluide, acrylamide, methacrylamide, acetamide, stearamide, benzamide and the like; imides such as succinimide, phathalimide, maleimide and the like; amines such as diphenylamine, phenylnaphthylamine, xylidine, N-phenylxylidine, carbazole, aniline, naphthylamine, butylamine, dibutylamine butylphenylamine and the like; imidazoles such as imidazole, 2-ethylimidazole and the like; pyrazoles such as 3,5-dimethylpyrazole; ureas such as urea, thiourea, ethyleneurea, diphenylurea and the like; carbamic acid esters such as phenyl N-phenylcarbamate; imines such as ethyleneimine, propyleneimine and the like; and sulfurous acid salt such as sodium disulfite, potassium disulfite and the like.

As the blocking agent, hydroxycarboxylic acid which has at least one hydroxyl group and at least one carboxyl group per molecule can be used. Examples of the hydroxycarboxylic acid include hydroxypivalic acid, dimethylolpropionic acid and the like. The blocked polyisocyanate compound blocked with such hydroxycarboxylic acid can be conveniently used because of good water dispersibility, as carboxyl groups which are hydrophilic are introduced into the compound by the carboxyl groups in the hydroxycarboxylic acid.

The urethane-modified polyester resin containing hydroxyl group and blocked isocyanate group concurrently per molecule is a self-crosslinking type resin, which can be synthesized, for example, by urethanation reaction of a part of hydroxyl groups in a hydroxyl-containing polyester resin with partially blocked polyisocyanate compound.

The water-based first coloring paint (A) can also contain polyol compound. As the polyol compound, those having a number-average molecular weight within a range of normally 100-2,000, in particular, 200-1,800, inter alia, 300-1,600, and the optimum, 400-1,000, are preferred, for excellent smoothness of resulting coating film.

The polyol compound contains at least two hydroxyl groups per molecule, examples of which include polyetherpolyol, polyesterpolyol, polycarbonatepolyol, polybutadienepolyol, hydrogenated polybutadienepolyol and the like. They can be used either alone or in combination of two or more.

As the polyetherpolyol, for example, polyethylene glycol, polypropylene glycol, poly(ethylene/propylene)glycol, polytetra-methylene glycol and poly(ethylene/tetramethylene) glycol can be named.

The polyesterpolyol has a combined content of benzene ring and cyclohexane ring of less than 1.0 mol/kg (solid resin), preferably 0.1-0.9 mol/kg (solid resin) and preferably an acid value normally less than 5 mgKOH/g, in particular, within a range of 0.1-4 mgKOH/g. The polyesterpolyol also preferably is a straight chain compound. As the polyesterpolyol, for example, those obtained by esterification reaction of polyhydric alcohol component with polybasic acid component, or those obtained by ring-opening reaction of lactone compound using polyhydric alcohol component as the initiator can be named. Those polyhydric alcohol component and polybasic acid component as exemplified in the explanation of the polyester resin (X) can be used, which can be used each either alone or in combination of two or more. As the lactone compound, for example, ε-caprolactone, poly-β-methyl-δ-valerolactone and the like can be named.

Examples of the polycarbonatepolyol include reaction products of polyhydric alcohols with phosgene, and ring-opening polymerization products of cyclic carbonic acid ester (alkylene carbonate and the like). As the polyhydric alcohol, for example, 3-methyl-1,5-pentanediol, 1,6-hexanediol and the like can be named, and as the cyclic carbonic acid ester, for example, ethylene carbonate, trimethylene carbonate, tetramethylene carbonate and the like can be named. The polycarbonatepolyol may also contain in its molecule an ester bond, concurrently with carbonate bond.

Where the water-based first coloring paint (A) contains the polyol compound, the use ratio of the polyol compound per 100 mass parts of the solid resin content of the water-based first coloring paint (A) preferably is within a range of generally 1-80 mass parts, in particular, 5-50 mass parts, inter alia, 10-25 mass parts.

The water-based first coloring paint (A) can further contain pigment. Examples of the pigment include coloring pigment, extender pigment and effect pigment, which can be used either alone or in combination of two or more.

Where the water-based first coloring paint contains pigment, the amount of the pigment to be blended can be within a range of generally 1-200 mass parts, preferably 20-150 mass parts, inter alia, 50-120 mass parts, per 100 mass parts of the solid resin content of the water-based first coloring paint (A).

Examples of the coloring pigment include titanium dioxide, zinc oxide, carbon black, lead sulfate, calcium plumbate, zinc phosphate, aluminum phosphate, zinc molybdate, calcium molybdate, Prussian blue, ultramarine, cobalt blue, copper phthalocyanine blue, indanthrone blue, chrome yellow, synthetic yellow iron oxide, transparent red iron oxide (yellow), bismuth vanadate, titanium yellow, zinc yellow, monoazo yellow, isoindolinone yellow, metal complex azo yellow, quinophthalone yellow, benzimidazolone yellow, red iron oxide, red lead, monoazo red, quinacridone red, azo lake (Mn salt), quinacridone mazenta, anthanthrone orange, dianthraquinonyl red, perylene maroon, quinacridone mazenta, perylene red, diketopyrrolopyrrole chrome vermilion, chlorinated phthalocyanine green, brominated phthalocyanine green, pyrazolone orange, benzimidazolone orange, dioxazine violet, perylene violet and the like. Of these, titanium dioxide and carbon black can be conveniently used.

Where the water-based first coloring paint (A) contains above coloring pigment, the amount of the coloring pigment to be blended can be within a range of normally 1-120 mass parts, preferably 10-100 mass parts, inter alia, 15-90 mass parts, per 100 mass parts of the solid resin content of the water-based first coloring paint (A).

Examples of the extender pigment include clay, kaolin, barium sulfate, barium carbonate, calcium carbonate, talc, silica, alumina white and the like. Of these, use of barium sulfate and/or talc is preferred.

Where the water-based first coloring paint (A) contains above extender pigment, the amount of the extender pigment to be blended can be within a range of normally 1-100 mass parts, preferably 5-60 mass parts, inter alia, 8-40 mass parts, per 100 mass parts of the solid resin content of the water-based first coloring paint (A).

Examples of the effect pigment include non-leafing type or leafing type aluminum (inclusive of vapor-deposited aluminum), copper, zinc, brass, nickel, aluminum oxide, mica, aluminum oxide coated with titanium dioxide or iron oxide, mica coated with titanium dioxide or iron oxide, glass flake and hologram pigment, which can be used either alone or in combination of two or more.

Where the water-based first coloring paint (A) contains above effect pigment, the amount of the effect pigment to be blended can be within a range of normally 1-50 mass parts, preferably 2-30 mass parts, inter alia, 3-20 mass parts, per 100 mass parts of the solid resin content of the water-based first coloring paint (A).

The water-based first coloring paint (A) further preferably contains curing catalyst. Examples of curing catalyst include organometal compounds such as tin caprylate, dibutyltin di(2-ethylhexanoate), dioctyltin di(2-ethylhexanoate), dioctyltin diacetate, dibutyltin dilaurate, dibutyltin oxide, dioctyltin oxide, dibutyltin fatty acid salt, lead 2-ethylhexanoate, zinc caprylate, zinc naphthenate, zinc salts of fatty acid, cobalt naphthenate, calcium caprylate, copper naphthenate, tetra(2-ethylhexyl)titanate and the like; tertiary amine; and phosphoric acid compound, which can be used either alone or in combination of two or more.

Where the water-based first coloring paint (A) contains above curing catalyst, the amount of the curing catalyst to be blended can be within a range of normally 0.001-5 mass parts, preferably 0.01-0.5 mass part, inter alia, 0.05-0.3 mass part, per 100 mass parts of the solid resin content of the water-based first coloring paint (A).

It is permissible to further suitably blend with the water-based first coloring paint (A), where necessary, those ordinary paint additives such as dispersant, antisettling agent, organic solvent, defoamer, thickener, rust-proofing agent, ultraviolet ray absorber, surface-regulating agent and the like.

The water-based first coloring paint (A) following the present invention may be either of one-package type or multi-package type, while from the viewpoint of storage stability it is preferred to make it a two-package type paint composed of the chief component (A1) containing the polyester resin (X) and curing agent (A2) containing the curing agent (Y). It is generally desirable that the chief component (A1) further contains pigment, curing catalyst and solvent, and the curing agent (A2) further contains solvent.

Where the isocyanate group-containing compound (a) is used as the curing agent (Y), the curing agent (A2) preferably further contains surfactant, in particular, anionic surfactant and/or nonionic surfactant, inter alia, anionic surfactant.

The water-based first coating paint (A) can be applied onto a coating object by the methods known per se, such as air spray, airless spray, rotary atomizing coater or the like. Static electricity may be impressed in the occasion of coating. Coating film thickness can be within a range of normally 10-100 µm, preferably 10-50 µm, inter alia, 15-35 µm, in terms of cured film thickness.

Also the water-based first coloring paint (A) following the present invention is preferably such a paint as will provide a coating film having a gel fraction within a range of generally 1-95 mass %, preferably 15-92 mass %, inter alia, 30-90 mass %, when the paint is applied to a cured film thickness of 30 µm and heated at 80° C. for 10 minutes, from the viewpoint of smoothness and distinctness of image of resulting coating film.

The coating object to which the water-based first coloring paint (A) is to be applied is subject to no particular limitation and, for example, may be those formed of such materials as metals and plastics. In particular, metallic or plastic automobile bodies or parts thereof, inter alia, sheet steel for automobile bodies, are suitable. Steel sheet for automobile bodies may be given such a chemical conversion treatment as zinc phosphate treatment, where necessary, as conventionally practiced, or may also be given electrocoating in advance.

Step (2):

On the coating film of the water-based first coloring paint (A) (which hereafter is referred to as the first coloring coating film) as formed in the step (1), then the water-based second coloring paint is applied.

It is preferable to adjust the solid content of the coating film of the water-based first coloring paint (A), before applying the water-based second coloring paint (B) thereon, for example by such means as preheating, air blowing or the like, to be within a range of normally 70-100 mass %, in particular, 80-100 mass %, inter alia, 90-100 mass %. It is also preferable to adjust the gel fraction of the coating film to be within a range of normally 1-95 mass %, in particular, 15-92 mass %, inter alia, 30-90 mass %.

The preheating can be effected normally by a direct or indirect heating of the coated object in a drying oven at temperatures of from about 50-about 110° C., preferably from about 60-about 90° C., for about 1-30 minutes. Also the air-blowing can be effected normally by blowing air of ambient temperature or heated to about 25° C.-about 80° C. against the coated surface of the object.

Here the solid content of the coating film can be measured by the following method:

first, simultaneously with coating a water-based first coloring paint (A) onto a coating object, the same water-based first coloring paint (A) is applied also onto an aluminum foil whose mass ($W_1$) was measured in advance. Subsequently, the aluminum foil which is subjected to a preheating or the like is recovered immediately before application of a water-based second coloring paint (B), and its mass ($W_2$) is measured. Next, the recovered aluminum foil is dried at 110° C. for 60 minutes and allowed to cool off to room temperature in a desiccator. Measuring the mass ($W_3$) of the aluminum foil, the solid content is determined according to the following equation.

$$\text{Solid content(mass\%)}=\{(W_3-W_1)/(W_2-W_1)\}\times 100.$$

The gel fraction of the coating film can be measured by the following method:

first, simultaneously with coating a water-based first coloring paint (A) onto a coating object, the water-based first coloring paint (A) is also applied on a polypropylene sheet, which is subsequently given such a treatment as preheating and is recovered immediately before application of a water-based second coloring paint (B). Then the first coloring coating film on the propylene sheet is recovered and its mass (Wa) is measured. The coating film is then put in a 300 mesh stainless steel net container, extracted in a mixed solvent of equal mass of 64° C. acetone and methanol for 5 hours, and dried at 100° C. for 60 minutes. The mass (Wb) of the coating film is measured after the drying and the residual ratio of insoluble coating film (mass %) is calculated by the following equation, as the gel fraction;

$$\text{gel fraction(mass\%)}=(Wb/Wa)\times 100.$$

As the water-based second coloring paint (B) to be coated on the first coloring coating film, for example, those formulated by dissolving or dispersing resin component comprising base resin such as acrylic, polyester, alkyd, urethane or epoxy resin having crosslinkable functional groups such as carboxyl, hydroxyl and the like groups, and crosslinking agent such as optionally blocked polyisocyanate compound, melamine resin, urea resin and the like, together with pigment and other additives, in water, can be used.

As the pigment, those coloring pigment, effect pigment, extender pigment and the like as exemplified in the explanation of the water-based first coloring paint (A) can be used. By using effect pigment as at least a part of the pigment component, elaborate metallic tone or pearlescent tone coating film can be formed.

The water-based second coloring paint (B) can be coated by the means known per se, for example, air spray, airless spray, rotary atomizing coater or the like. Static electricity may be impressed at the coating time. The coating film thickness can be within a range of normally 5-40 µm, preferably 10-30 µm, in terms of cured film thickness.

The coating film of the water-based second coloring paint (B) so applied can be dried by, for example, heating by such means as preheating or air blowing at about 50-about 110° C., preferably about 60-about 90° C., for around 1-60 minutes.

Step 3

Onto the coating film of the water-based second coloring paint (B) ("the second coloring coating film") as formed in the above step (2), further a clear paint (C) is coated.

As the clear paint (C), those known per se, for example, those customarily used for coating automobile bodies can be used. Specifically, for example, organic solvent-based thermosetting paint, water-based thermosetting paint, thermosetting powder paint and the like can be named, which comprise as resin components a base resin such as acrylic resin, polyester resin, alkyd resin, urethane resin, epoxy resin, fluorine-containing resin and the like, having crosslinkable functional groups such as hydroxyl, carboxyl, epoxy, silanol or the like groups; and a crosslinking agent such as melamine resin, urea resin, optionally blocked polyisocyanate compound, carboxyl-containing compound or resin, epoxy-containing compound or resin. Of these, thermosetting paint comprising hydroxyl-containing resin and melamine resin, thermosetting paint comprising carboxyl-containing resin and epoxy-containing resin, and thermosetting paint comprising hydroxyl-containing resin and optionally blocked polyisocyanate compound, are preferred.

The clear paint (C) may be one-package type, or two-package type like two-package type urethane resin paint.

The clear paint (C) may also contain, where necessary, coloring pigment, effect pigment, dye and the like to an extent not interfering with its transparency, and furthermore can suitably contain such paint additives as extender, ultraviolet absorber, defoamer, thickener, rust proofing agent, surface regulating agent and the like.

The clear paint (C) can be applied onto the coated film surface of the water-based second coloring paint (B) by a method known per se, such as airless spray, air spray, rotary atomizing coater or the like. Static electricity may be impressed during the coating time. The coating film thickness can be made within a range of normally 10-60 µm, preferably 25-50 µm, in terms of cured film thickness.

Step (4):

The multilayer coating film formed of the three layers of the first coloring coating film, second coloring coating film and clear coating film as formed in the above-described steps (1)-(3) can be cured simultaneously, by heating at about 80-about 170° C., preferably about 120-about 160° C. for about 20-about 40 minutes, by ordinary baking means of coating film, such as hot air heating, infrared heating, high frequency heating and the like. Whereby multilayer coating film excelling in smoothness, distinctness of image, chipping resistance and water resistance can be formed.

EXAMPLES

Hereinafter the invention is explained more specifically, referring to working Examples, it being understood that the invention is not limited to these Examples only. "Part" and "%" are "mass part" and "mass %".

Production of Polyester Resin Solution

Production Example 1

A reactor equipped with a thermometer, thermostat, stirrer, reflux condenser and water separator was charged with 174 parts of trimethylolpropane (molecular weight 134), 327 parts of neopentyl glycol (molecular weight 104), 352 parts of adipic acid (molecular weight 146), 109 parts of isophthalic acid (molecular weight 166) and 101 parts of hexahydrophthalic anhydride (molecular weight 154), and the temperature therein was raised from 160° C. to 230° C. over 3 hours. While distilling the formed water of condensation off with the water separator, the reaction was continued at 230° C. until the acid value of the reaction product became not higher than 3 mgKOH/g. To this reaction product, 59 parts of trimellitic anhydride (molecular weight 192) was added, and the addition reaction was carried out at 170° C. for 30 minutes, followed by neutralization by addition of 2-(dimethylamino) ethanol of equivalent amount to the acid group. Then deionized water was gradually added to effect the product's dispersion in water, to provide a polyester resin solution (X-1) having a solid content of 45% and a pH of 7.2. Thus obtained polyester resin had a combined content of benzene ring and cyclohexane ring of 1.62 mols/kg (solid resin content), acid value of 35 mgKOH/g, hydroxyl value of 130 mgKOH/g, number-average molecular weight of 1,440, and glass transition temperature of −15° C.

The combined content of benzene ring and cyclohexane ring in the formed polyester resin was calculated by the following equation:

Total mol number($Wm$) of benzene ring and cyclohexane ring=109/166(isophthalic acid)+101/154 (hexahydrophthalic anhydride)+59/192(trimellitic anhydride)=1.62[mol]

Mass of water of condensation=18×{2×352/146(adipic acid)+2×109/166(isophthalic acid)+1×101/154(hexahydrophthalic anhydride)}=122[g]

Resin yield($Wr$) excluding water of condensation=174 (trimethylolpropane)+327(neopentyl glycol)+352 (adipic acid)+109(isophthalic acid)+101(hexahydrophthalic anhydride)+59(trimellitic anhydride)−122(water of condensation)= 1,000[g]=1[kg]

Combined concentration of benzene ring and cyclohexane ring=combined mol number($Wm$) of benzene ring and cyclohexane ring/resin yield excluding the water of condensation($Wr$)=1.62/1=1.62[mol/kg(solid resin content)]

Production Examples 2-14

Compositions as indicated in the following Table 1 were treated similarly to Production Example 1 to provide polyester resin solutions (X-2)–(X-14) all having a solid content of 45% and pH 7.2. The combined concentration of benzene ring and cyclohexane ring, acid value, hydroxyl value, number-average molecular weight and glass transition temperature of each of the resulting polyester resins are shown in Table 1, concurrently with those of the polyester resin solution (X-1) as obtained in Production Example 1.

TABLE 1

| Production Example | 1 | 2 | 3 | 4 | 5 | 6 | 7 |
|---|---|---|---|---|---|---|---|
| Polyester resin solution | X-1 | X-2 | X-3 | X-4 | X-5 | X-6 | X-7 |
| Trimethylolpropane (molecular weight, 134) | 174 | 174 | 173 | 176 | 178 | 280 | |
| Neopentyl glycol (molecular weight, 104) | 327 | 328 | 326 | 332 | 319 | 233 | 480 |
| Adipic acid (molecular weight, 146) | 352 | 354 | 351 | 448 | 286 | 343 | 367 |
| Isophthalic acid (molecular weight, 166) | 109 | 219 | | 59 | 202 | 106 | 114 |
| Hexahydrophthalic anhydride (molecular weight, 154) | 101 | | 202 | 55 | 80 | 99 | 106 |
| Trimellitic anhydride (molecular weight, 192) | 59 | 59 | 59 | 60 | 58 | 58 | 61 |
| HILAC HK-901 (note 1) (molecular weight, 878) | | | | | | | |
| Combined concentration of benzene ring and cyclohexane ring [mol/kg (solid resin content)] | 1.62 | 1.63 | 1.62 | 1.02 | 2.04 | 1.58 | 1.69 |
| Acid value [mgKOH/g] | 35 | 35 | 35 | 35 | 35 | 35 | 35 |
| Hydroxyl value [mgKOH/g] | 130 | 130 | 130 | 132 | 130 | 172 | 61 |
| Number average molecular weigjt | 1440 | 1440 | 1450 | 1420 | 1460 | 1480 | 1390 |
| Glass transition temperature [° C.] | −15 | −10 | −18 | −20 | 0 | −12 | −15 |

| Production Example | 8 | 9 | 10 | 11 | 12 | 13 | 14 |
|---|---|---|---|---|---|---|---|
| Polyester resin solution | X-8 | X-9 | X-10 | X-11 | X-12 | X-13 | X-14 |
| Trimethylolpropane (molecular weight, 134) | 99 | 230 | 232 | 214 | 175 | 177 | 171 |
| Neopentyl glycol (molecular weight, 104) | 431 | 266 | 291 | 269 | 291 | 332 | 322 |
| Adipic acid (molecular weight, 146) | 282 | 370 | 358 | 331 | 380 | 462 | 259 |
| Isophthalic acid (molecular weight, 166) | 120 | 105 | 111 | 103 | 151 | 52 | 158 |
| Hexahydrophthalic anhydride (molecular weight, 154) | 112 | 98 | 103 | 95 | | 48 | 147 |
| Trimellitic anhydride (molecular weight, 192) | 65 | 57 | 30 | 103 | 56 | 60 | 58 |
| HILAC HK-901 (note 1) (molecular weight, 878) | | | | | 75 | | |
| Combined concentration of benzene ring and cyclohexane ring [mol/kg (solid resin content)] | 1.79 | 1.56 | 1.49 | 1.77 | 1.88 | 0.94 | 2.21 |
| Acid value [mgKOH/g] | 35 | 35 | 20 | 62 | 35 | 35 | 35 |
| Hydroxyl value [mgKOH/g] | 186 | 128 | 164 | 129 | 126 | 131 | 127 |
| Number average molecular weigjt | 670 | 2180 | 1420 | 1530 | 1540 | 1430 | 1480 |
| Glass transition temperature [° C.] | −31 | −8 | −18 | −7 | −7 | −22 | 7 |

(note 1)
HILAC KH-901: tradename, Hitachi Chemical Co., carbonyl group-containing polyhydric alcohol, molecular weight, 878; solid content, 100%

Production Example 15

A reactor equipped with a thermometer, thermostat, stirrer, reflux condenser and water separator was charged with 109 parts of trimethylolpropane, 141 parts of 1,6-hexanediol, 126 parts of hexahydrophthalic anhydride and 120 parts of adipic acid, which were heated from 160° C. to 230° C. over three hours and subjected to condensation reaction at 230° C. for 4 hours. Then further 38.3 parts of trimellitic anhydride was added to add carboxyl groups to the resulting condensation reaction product, reacted at 170° C. for 30 minutes and diluted with 2-ethyl-1-hexanol, to provide polyester resin solution (PE) having a solid content of 70%. Thus obtained polyester resin had an acid value of 46 mgKOH/g, hydroxyl value of 150 mgKOH/g, and weight-average molecular weight of 6,400.

Production of Acrylic Emulsion

Production Example 16

A reactor equipped with a thermometer, thermostat, stirrer, reflux condenser and dropping device was charged with 130 parts of deionized water and 0.52 part of AQUALON KH-10 (note 2) which were stirred and mixed in a nitrogen gas current, and the temperature was raised to 80° C. Then 1% of the total amount of the following monomeric emulsion (1) and 5.3 parts of 6% aqueous ammonium persulfate solution were introduced into the reactor and kept at 80° C. for 15 minutes. The remainder of the monomeric emulsion (1) was dropped into the reactor which was maintained at the same temperature, over 3 hours, followed by 1 hour's aging. Thereafter the following monomeric emulsion (2) was added dropwise over an hour, and after the subsequent 1 hour's aging, the reactor was cooled to 30° C. under gradual addition of 40 parts of 5.0% aqueous dimethylethanolamine solution thereinto. The content of the reactor was discharged while being filtered through 100-mesh Nylon cloth, to provide an acrylic emulsion having an average particle size of 100 nm [measured with a submicron particle size distribution-measuring device, COULTER N4 type (tradename, Beckman Coulter, Inc.) as diluted with deionized water, at 20° C.], acid value of 33 mgKOH/g, hydroxyl value of 25 mgKOH/g and solid content of 30%.

(note 2) AQUALON KH-10: tradename, Daiichi Kogyo Seiyaku Co., Ltd., polyoxyethylene alkylether sulfate ester ammonium salt, active ingredient, 97%

Monomeric emulsion (1): Mixing by stirring 42 parts of deionized water, 0.72 part of AQUALON KH-10, 2.1 parts of allyl methacrylate, 2.8 parts of styrene, 16.1 parts of methyl methacrylate, 28 parts of ethyl acrylate and 21 parts of n-butyl acrylate, monomeric emulsion (1) was obtained.

Monomeric emulsion (2): Mixing by stirring 18 parts of deionized water, 0.31 part of AQUALON KH-10, 0.03 part of ammonium persulfate, 5.1 parts of methacrylic acid, 5.1 parts of 2-hydroxyethyl acrylate, 3 parts of styrene, 6 parts of methyl methacrylate, 1.8 parts of ethyl acrylate and 9 parts of n-butyl acrylate, monomeric emulsion (2) was obtained.

Production of Effect Pigment Concentrate

Production Example 17

In an agitation mixing vessel, 35 parts of ethylene glycol monobutyl ether was put and mixed uniformly with 19 parts of an aluminum pigment paste, GX-180A (tradename, Asahikasei Metals Co., metal content 74%), 8 parts of phosphoric acid group-containing resin solution$^{(note\ 3)}$ and 0.2 part of 2-(dimethylamino)ethanol to provide an effect pigment concentrate.

(note 3) Phosphoric acid group-containing resin solution: A reactor equipped with a thermometer, theremostat, stirrer, reflux condenser and dropping device was charged with a mixed solvent formed of 27.5 parts of methoxypropanol and 27.5 parts of isobutanol. Heating the same to 110° C., 121.5 parts of a mixture formed of 25 parts of styrene, 27.5 parts of n-butyl methacrylate, 20 parts of Isostearyl Acrylate (tradename, Osaka Organic Chemical Industry, Ltd., branched higher alkyl acrylate), 7.5 parts of 4-hydroxybutyl acrylate, 15 parts of phosphoric acid group-containing polymerizable monomer$^{(note\ 4)}$, 12.5 parts of 2-methacryloyloxyethyl acid phosphate, 10 parts of isobutanol and 4 parts of t-butylperoxyoctanoate was added to the mixed solvent over 4 hours. Further a mixture formed of 0.5 part of t-butylperoxyoctanoate and 20 parts of isopropanol was added dropwise over an hour. After the following an hour's aging under stirring, a phosphoric acid group-containing resin solution having a solid content of 50% was obtained. The acid value of this resin attributable to the phosphoric acid groups was 83 mgKOH/g, hydroxyl value attributables to 4-hydroxybutyl acrylate was 29 mgKOH/g, and weight-average molecular weight was 10,000.

(note 4) Phosphoric acid group-containing polymerizable monomer: A reactor equipped with a thermometer, thermostat, stirrer, reflux condenser and dropping device was charged with 57.5 parts of monobutylphosphoric acid and 41 parts of isobutanol. Raising the temperature to 90° C., 42.5 parts of glycidyl methacrylate was added dropwise over 2 hours, followed by an hour's aging under stirring. Then 59 parts of isopropanol was added to provide a phosphoric acid group-containing polymerizable monomer solution having a solid content of 50%. Thus obtained monomer had an acid value attributable to the phosphoric acid groups of 285 mgKOH/g.

Production of Anionic Polyisocyanate Compound Imparted with Hydrophilicity (a'-1)

Production Example 18

A sulfonic acid-modified polyisocyanate compound solution (a'-1-1) having a solid content of 80% and NCO content of 16.0% was obtained by reacting 970 g (5.00 mols) of polyisocyanate having isocyanurate groups, NCO content of 21.7% based on hexamethylene diisocyanate (HDI), average NCO functional value of 3.5 (by GPC), monomeric HDI content of 0.1% and viscosity of 3,000 mPas (23° C.), 30 g (0.14 mol) of 3-(cyclohexylamino)propanesulfonic acid, 17.4 g (0.14 mol) of dimethylcyclohexylamine and 254 g of 1-methoxypropyl-2-acetate, in dry nitrogen at 80° C. for 5 hours under stirring.

Production of Water-Based First Coloring Paint (A)

Production Examples 19-45

Polyester resins (X-1)-(X-14) as obtained in above Production Examples 1-14, the following pigments (P-1)-(P-3), the following curing agents (Y-1)-(Y-9), ADEKA POLYETHER P-1000 (tradename, Asahi Denka Co., Ltd.; polyetherpolyol; number-average molecular weight, 1,000) and tin catalyst, Scat-1W (tradename, Sankyo Organic Chemicals Co., Ltd., a butyltin-derived catalyst) at the blend ratios as shown in the following Table 2 were stirred and mixed with a dispersing device to be formulated into paints, to provide water-based first coloring paints (A-1)-(A-27). The composition of each of the water-based first coloring paint as shown in Table 2 is given by solid mass ratio. In the occasion of blending the pigment component, 44.4 parts (solid resin content, 20 parts) of the polyester resin in each of the water-based first coloring paint and pigment of the amount specified in the table were mixed under addition of 20 parts of deionized water, adjusted to pH 8.0 with 2-(dimethylamino)ethanol, and dispersed in a paint shaker for 30 minutes to provide a pigment-dispersed paste. Mixing the paste with those other components under stirring, deionized water and 2-(dimethylamino)ethanol were added to adjust the pH to 8.0 and the viscosity, to 40 seconds at 20° C. using Ford cup No. 4, each of the water-based first coloring paint was obtained.

The pigments (P-1)-(P-3) and curing agents (Y-1)-(Y-9) in Table 2 are respectively as follows:

Pigment (P-1): JR-806 (tradename, Tayca Corporation, routile type titanium dioxide)

Pigment (P-2): MICRO ACE S-3 (tradename, Nippon Talc Co., Ltd., talc)

Pigment (P-3): CARBON MA-100 (tradename, Mitsubishi Chemicals Co., carbon black)

Curing agent (Y-1): the sulfonic acid-modified polyisocyanate compound solution (a'-1-1) as obtained in Production Example 18, solid content, 80%; NCO content, 16.0%

Curing agent (Y-2): TAKENATE WD-220 (tradename Mitsui Chemical Polyurethane Co., nonionic modified isocyanate; solid content, 100%; NCO content, 17.4%)

Curing agent (Y-3): DESMODUR N3400 (tradename, polyisocyanate made by Sumika Bayer Urethane Co., Ltd.; urethodione body of hexamethylene diisocyanate; solid content, 100%; NCO content, 21.8%)

Curing agent (Y-4): EPOCROS WS-300 (tradename, Nippon Shokubai Co., Ltd.; oxazoline group-containing compound; solid content, 40%; oxazoline group content, 4.5 mmols/g solid resin)

Curing agent (Y-5): CARBODILITE E-02 (tradename, Nisshinbo Industries, Inc.; carbodiimide group-containing compound; solid content, 40%; carodimide group content, 2.3 mmols/g solid resin)

Curing agent (Y-6): adipic dihydrazide (10% aqueous solution, hydrazide group content, 11.48 mmols/g solid resin)

Curing agent (Y-7): SX-601 (tradename, Asahi Kasei Corporation; semicarbazide group-containing compound; solid content, 45%; semicarbazide group content, 4.8 mmols/g solid resin)

Curing agent (Y-8): CYMEL 325 (tradename, Nihon Cytec Industries, Inc.; melamine resin; solid content, 80%)

Curing agent (Y-9): VPLS 2310 (tradename, Sumika Bayer Urethane Co., Ltd.; aliphatic blocked isocyanate)

emulsion as obtained in Production Example 16, 62 parts of the effect pigment concentrate as obtained in Production Example 17 and 37.5 parts of CYMEL 325 (tradename, Nihon Cytec Industries, Inc.; melamine resin; solid content, 80%), and further adding deionized water and 2-(dimethylamino)ethanol to adjust its pH to 8.0 and the solid content, 23%.

Coating Film-Forming Method

Using the water-based first coloring paints (A-1)-(A-27) as obtained in the foregoing Production Examples 19-45 and the water-based second coloring paint (B-1) as obtained in above Production Example 46, test panels were prepared as follows, and their evaluation tests were conducted.

(Preparation of Coated Objects for the Tests)

Cold-rolled sheets applied with PARBOND #3020 (Nippon Perkerizing Zo., Ltd.; zinc phosphate treating agent) were electrocoated with ELECRON GT-10 (tradename, Kansai Paint Co., cationic electrodeposition paint) to a dry film thickness of 20 μm, and heated at 170° C. for 30 minutes to cure the coating film, to provide coated objects for the tests.

Example 1

In a coating atmosphere of 23° C. in temperature and 75% in humidity, the water-based first coloring paint (A-1) as obtained in Production Example 19 was applied onto the

TABLE 2

| Production Example | Water-based first coloring paint (A) | Pigment-dispersed paste Polyester resin (X) kind | amount (solid content) | Pigment P-1 | P-2 | P-3 | Polyester resin (X) kind | amount (solid content) | Curing agent (Y) (solid content) Y-1 | Y-2 | Y-3 | Y-4 | Y-5 | Y-6 | Y-7 | Y-8 | Y-9 | Polyol (solid content) ADEKA Polyether P-1000 | Catalyst (solid content) Scat-1W |
|---|---|---|---|---|---|---|---|---|---|---|---|---|---|---|---|---|---|---|---|
| 19 | A-1 | X-1 | 20 | 80 | 10 | 1 | X-1 | 42 | 38 | | | | | | | | | 0 | 0 |
| 20 | A-2 | X-2 | 20 | 80 | 10 | 1 | X-2 | 42 | 38 | | | | | | | | | 0 | 0 |
| 21 | A-3 | X-3 | 20 | 80 | 10 | 1 | X-3 | 42 | 38 | | | | | | | | | 0 | 0 |
| 22 | A-4 | X-3 | 20 | 80 | 10 | 1 | X-3 | 42 | 38 | | | | | | | | | 15 | 0 |
| 23 | A-5 | X-4 | 20 | 80 | 10 | 1 | X-4 | 42 | 38 | | | | | | | | | 0 | 0 |
| 24 | A-6 | X-5 | 20 | 80 | 10 | 1 | X-5 | 42 | 38 | | | | | | | | | 0 | 0 |
| 25 | A-7 | X-6 | 20 | 80 | 10 | 1 | X-6 | 35 | 45 | | | | | | | | | 0 | 0 |
| 26 | A-8 | X-7 | 20 | 80 | 10 | 1 | X-7 | 58 | 22 | | | | | | | | | 0 | 0 |
| 27 | A-9 | X-8 | 20 | 80 | 10 | 1 | X-8 | 33 | 47 | | | | | | | | | 0 | 0 |
| 28 | A-10 | X-9 | 20 | 80 | 10 | 1 | X-9 | 43 | 37 | | | | | | | | | 0 | 0 |
| 29 | A-11 | X-10 | 20 | 80 | 10 | 1 | X-10 | 37 | 43 | | | | | | | | | 0 | 0 |
| 30 | A-12 | X-11 | 20 | 80 | 10 | 1 | X-11 | 42 | 38 | | | | | | | | | 0 | 0 |
| 31 | A-13 | X-1 | 20 | 80 | 10 | 1 | X-1 | 44 | | 36 | | | | | | | | 0 | 0 |
| 32 | A-14 | X-1 | 20 | 80 | 10 | 1 | X-1 | 45 | 24 | | 11 | | | | | | | 0 | 0 |
| 33 | A-15 | X-11 | 20 | 80 | 10 | 1 | X-11 | 60 | | | | 20 | | | | | | 0 | 0 |
| 34 | A-16 | X-11 | 20 | 80 | 10 | 1 | X-11 | 58 | | | | | 22 | | | | | 0 | 0 |
| 35 | A-17 | X-12 | 20 | 80 | 10 | 1 | X-12 | 74 | | | | | | 6 | | | | 0 | 0 |
| 36 | A-18 | X-12 | 20 | 80 | 10 | 1 | X-12 | 68 | | | | | | | 12 | | | 0 | 0 |
| 37 | A-19 | X-1 | 20 | 80 | 10 | 1 | X-1 | 54 | 13 | | | | | | 13 | | | 0 | 0 |
| 38 | A-20 | X-1 | 20 | 80 | 10 | 1 | X-1 | 54 | 13 | | | | | | | 13 | | 0 | 0 |
| 39 | A-21 | X-1 | 20 | 80 | 10 | 1 | X-1 | 54 | 13 | | | | | | | 7 | 7 | 0 | 0 |
| 40 | A-22 | X-1 | 20 | 80 | 10 | 1 | X-1 | 42 | 38 | | | | | | | | | 0 | 0.1 |
| 41 | A-23 | X-3 | 20 | 80 | 10 | 1 | X-3 | 42 | 38 | | | | | | | | | 15 | 0.1 |
| 42 | A-24 | X-13 | 20 | 80 | 10 | 1 | X-13 | 42 | 38 | | | | | | | | | 0 | 0 |
| 43 | A-25 | X-14 | 20 | 80 | 10 | 1 | X-14 | 43 | 37 | | | | | | | | | 0 | 0 |
| 44 | A-26 | X-1 | 20 | 80 | 10 | 1 | X-1 | 54 | | | | | | 26 | | | | 0 | 0 |
| 45 | A-27 | X-1 | 20 | 80 | 10 | 1 | X-1 | 30 | | | | | | | | | 50 | 0 | 0 |

Production of Water-Based Second Coloring Paint (B)

Production Example 46

Water-based second coloring paint (B-1) was obtained by uniformly mixing 57 parts of the polyester resin solution (PE) as obtained in Production Example 15, 100 parts of the acrylic above coated object to be tested, earlier described aluminum foil for measuring solid content and the polypropylene sheet for measuring gel fraction of formed coating film with a rotary atomizing coater to a cured film thickness of 30 μm. After subsequent preheating at 80° C. for 10 minutes, the solid content and gel fraction of the first coloring coating film were measured. The measured results are shown in Table 3.

Then onto the first coloring coating film, water-based second coloring coating paint (B-1) as obtained in Production Example 46 was applied with a rotary atomizing type bell-shaped coater to a cured film thickness of 15 μm, followed by preheating at 80° C. for 3 minutes. Onto the second coloring coating film, MAGICRON KINO-1210 (tradename, Kansai Paint Co., acrylic resin solvent-based top clear paint, which hereafter may be referred to as "clear paint (C-1)") was applied to a cured film thickness of 40 μm. After 7 minutes' standing, the first coloring coating film, second coloring coating film and clear coating film were simultaneously cured by heating at 140° C. for 30 minutes, to provide a test panel.

Examples 2-23, Comparative Examples 1-4

Respective test panels were prepared by the operations similar to Example 1, except that the water-based first coloring paint (A-1) as obtained in Production Example 19 was replaced with water-based first coloring paints (A-2)-(A-27) as shown in Table 3.

The test panels as obtained in above Examples 1-23 and Comparative Examples 1-4 were evaluated by the following test methods. The results of evaluation are shown in Table 3.
(Test Methods)
Smoothness: evaluated by means of Long Wave (LW) values measured with Wave Scan (tradename, BYK Gardner Co.). Long Wave (LW) value is an index of amplitude of surface roughness of the wavelength ranging around 1.2-12 mm. The less the measured value, the higher the smoothness of the coated surface.

Distinctness of image: evaluated by means of Short Wave (SW) values measured with above Wave Scan. Short Wave (SW) value is an index of amplitude of surface roughness of the wavelength ranging about 0.3-1.2 mm. The less the measured value, the higher the distinctness of image of the coated surface.

Chipping Resistance:
Each of the test panels was mounted on a test piece support in Suga Test Instruments Co., Ltd.'s gravel chipping test instrument JA-400 type (tradename, a chipping test device), and 50 g of crushed granite rock of particle size No. 7 was blown at the coated surface with compressed air of 0.392 MPa (4 kgf/cm$^2$) at −20° C. The extent of thereby incurred damage on the coated film was visually observed and evaluated according to the following standard.

⊙: Size of the damage was very small, and the electrocoated surface or substrate steel sheet was not exposed.

○: Size of the damage was small, and the electrocoated surface or substrate steel sheet was not exposed.

Δ: Size of the damage was small but the electrocoated surface or substrate steel sheet was exposed.

x: Size of the damage was considerably large and the substrate steel sheet also was heavily exposed.

Water resistance: The test panels were immersed in 40° C. warm water for 240 hours, withdrawn and dried at 20° C. for 12 hours. The multilayer coating film on each test panel was crosscut with a cutter to the depth reaching the substrate, to form one-hundred 2 mm×2 mm squares. Then an adhesive cellophane tape was stuck thereon, and rapidly peeled off at 20° C. The condition of the crosscut coating film was examined and was evaluated according to the following standard.

⊙: One-hundred squares of the coating film remained and no minor peeling occurred at the cutting edges with the cutter.

○: One-hundred squares of the coating film remained, but minor peeling of the coating occurred at the cutting edges with the cutter occurred.

Δ: Remaining number of the squares was 90-99.

x: Remaining number of the square was not more than 89.

TABLE 3

| | | Water-based first coloring Paint (A) | | Property of water-based first coloring paint (A) immediately before water based second coloring paint (B) was applied | | Water-based second coloring paint (B) | Clear Paint (C) | Results of Evaluation | | | |
|---|---|---|---|---|---|---|---|---|---|---|---|
| | | Production Example | Paint | Solid content [mass %] | Gel fraction [mass %] | | | Smoothness | Distinctness of image | Chipping resistance | Water resistance |
| Example | 1 | 19 | A-1 | 95 | 52 | B-1 | C-1 | 5.6 | 6.1 | ⊙ | ⊙ |
| | 2 | 20 | A-2 | 95 | 51 | | | 5.7 | 6.2 | ⊙ | ⊙ |
| | 3 | 21 | A-3 | 92 | 48 | | | 5.9 | 6.1 | ⊙ | ⊙ |
| | 4 | 22 | A-4 | 93 | 49 | | | 5.4 | 6.0 | ⊙ | ⊙ |
| | 5 | 23 | A-5 | 93 | 52 | | | 8.2 | 6.4 | ⊙ | ⊙ |
| | 6 | 24 | A-6 | 93 | 47 | | | 8.3 | 6.4 | ○ | ⊙ |
| | 7 | 25 | A-7 | 94 | 56 | | | 6.2 | 6.1 | ⊙ | ○ |
| | 8 | 26 | A-8 | 94 | 18 | | | 6.9 | 8.3 | ⊙ | ○ |
| | 9 | 27 | A-9 | 93 | 19 | | | 6.5 | 8.4 | ○ | ⊙ |
| | 10 | 28 | A-10 | 90 | 47 | | | 8.1 | 6.2 | ⊙ | ⊙ |
| | 11 | 29 | A-11 | 88 | 48 | | | 7.2 | 6.4 | ⊙ | ⊙ |
| | 12 | 30 | A-12 | 89 | 50 | | | 6.2 | 6.3 | ⊙ | ○ |
| | 13 | 31 | A-13 | 94 | 50 | | | 8.3 | 6.3 | ⊙ | ⊙ |
| | 14 | 32 | A-14 | 94 | 53 | | | 6.2 | 6.4 | ⊙ | ⊙ |
| | 15 | 33 | A-15 | 92 | 12 | | | 9.3 | 8.6 | ○ | ⊙ |
| | 16 | 34 | A-16 | 93 | 51 | | | 5.7 | 6.3 | ⊙ | ⊙ |
| | 17 | 35 | A-17 | 92 | 11 | | | 9.4 | 8.6 | ○ | ⊙ |
| | 18 | 36 | A-18 | 91 | 10 | | | 9.0 | 8.9 | ○ | ⊙ |
| | 19 | 37 | A-19 | 93 | 30 | | | 8.7 | 6.6 | ⊙ | ⊙ |
| | 20 | 38 | A-20 | 90 | 30 | | | 8.6 | 6.7 | ⊙ | ⊙ |
| | 21 | 39 | A-21 | 91 | 31 | | | 8.7 | 6.8 | ⊙ | ⊙ |
| | 22 | 40 | A-22 | 95 | 85 | | | 5.9 | 6.0 | ⊙ | ⊙ |
| | 23 | 41 | A-23 | 93 | 81 | | | 5.5 | 5.9 | ⊙ | ⊙ |

TABLE 3-continued

| | | Water-based first coloring Paint (A) | | Property of water-based first coloring paint (A) immediately before water based second coloring paint (B) was applied | | Water-based second coloring paint (B) | Clear Paint (C) | Results of Evaluation | | | |
|---|---|---|---|---|---|---|---|---|---|---|---|
| | | Production Example | Paint | Solid content [mass %] | Gel fraction [mass %] | | | Smoothness | Distinctness of image | Chipping resistance | Water resistance |
| Comparative Example | 1 | 42 | A-24 | 93 | 42 | | | 13.2 | 15.2 | Δ | Δ |
| | 2 | 43 | A-25 | 93 | 50 | | | 21.3 | 11.6 | Δ | Δ |
| | 3 | 44 | A-26 | 92 | 1 | | | 20.0 | 16.3 | Δ | Δ |
| | 4 | 45 | A-27 | 91 | 2 | | | 18.9 | 16.3 | Δ | Δ |

The invention claimed is:

1. A method for forming multilayer coating film by successively conducting the following steps (1)-(4):
    (1) a step of applying onto a coating object a water-based first coloring paint (A) to form the first coloring coating film,
    (2) a step of applying a water-based second coloring paint (B) on the first coloring coating film as formed in the step (1), to form the second coloring coating film,
    (3) a step of applying a clear paint (C) on the second coloring coating film as formed in the step (2), to form the clear coating film, and
    (4) a step of simultaneously baking the first coloring coating film, second coloring coating film and clear coating film as formed in the steps (1)-(3),
    wherein the water-based first coloring paint (A) comprises polyester resin (X) and curing agent (Y), the polyester resin (X) containing benzene ring and/or cyclohexane ring in its molecules, their combined content in the polyester resin being within a range of 1.0-2.2 mols/kg (solid resin content); and that the curing agent (Y) is at least one compound selected from the group consisting of isocyanate group-containing compound (a), oxazoline group-containing compound (b), carbodiimide group-containing compound (c), hydrazide group-containing compound (d) and semicarbazide group-containing compound (e).

2. The method according to claim 1, in which the combined content of benzene ring and/or cyclohexane ring in the polyester resin (X) is within a range of 1.2-2.0 mols/kg (solid resin content).

3. The method according to claim 1, in which the polyester resin (X) has an acid value within a range of 5-80 mgKOH/g and a hydroxyl value within a range of 60-200 mgKOH/g.

4. The method according to claim 1, in which the polyester resin (X) has a number-average molecular weight within a range of 500-4,000.

5. The method according to claim 1, in which the polyester resin (X) has a glass transition temperature within a range of −60-20° C.

6. The method according to claim 1, in which the water-based first coloring paint (A) contains the polyester resin (X) at a ratio of 10-95 mass parts per 100 mass parts of the solid resin content of the water-based first coloring paint (A).

7. The method according to claim 1, in which the polyester resin (X) is a hydroxyl group-containing polyester resin and the curing agent (Y) is a polyisocyanate compound (a') which is rendered hydrophilic.

8. The method according to claim 1, in which the water-based first coloring paint (A) contains the curing agent (Y) at a ratio of 1-60 mass parts per 100 mass parts of the solid resin content in the water-based first coloring paint (A).

9. The method according to claim 1, in which the water-based first coloring paint (A) further contains a polyol compound having a number-average molecular weight within a range of 100-2,000.

10. The method according to claim 9, in which the water-based first coloring paint (A) contains the polyol compound at a ratio of 1-80 mass parts per 100 mass parts of the solid resin content of the water-based first coloring paint (A).

11. The method according to claim 1, in which the water-based first coloring paint (A) is such that the gel fraction of its coating film, after being applied to a cured film thickness of 30 μm and heated at 80° C. for 10 minutes, falls within a range of 1-95 mass %.

12. The method according to claim 1, in which the first coloring coating film has a solid content of 70-100 mass % and a gel fraction of 1-95 mass % immediately before application of the water-based second coloring paint (B) in the step (2).

13. The method according to claim 1, in which the first coloring coating film formed in the step (1) is preheated at a temperature of 50-110° C. for 1-30 minutes, and thereafter the water-based second coloring paint (B) is applied onto the first coloring coating film to form the second coloring coating film in the step (2).

14. The method according to claim 1, in which the coating object is an electrocoated steel sheet.

* * * * *